US012025421B2

(12) United States Patent
Kharatyan et al.

(10) Patent No.: US 12,025,421 B2
(45) Date of Patent: Jul. 2, 2024

(54) TRANSPORT OF EXPLOSIVES

(71) Applicant: AECI MINING LIMITED, Sandton (ZA)

(72) Inventors: Ellina Kharatyan, Gauteng (ZA); Philliphus Rudolf Kotze, Gauteng (ZA)

(73) Assignee: AECI Mining Limited, Sandton (ZA)

( * ) Notice: Subject to any disclaimer, the term of this patent is extended or adjusted under 35 U.S.C. 154(b) by 87 days.

(21) Appl. No.: 17/919,462

(22) PCT Filed: Apr. 20, 2021

(86) PCT No.: PCT/IB2021/053250
§ 371 (c)(1),
(2) Date: Oct. 17, 2022

(87) PCT Pub. No.: WO2021/214655
PCT Pub. Date: Oct. 28, 2021

(65) Prior Publication Data
US 2023/0152073 A1 May 18, 2023

(30) Foreign Application Priority Data
Apr. 22, 2020 (GB) ..................... 2005868

(51) Int. Cl.
*F42D 1/10* (2006.01)
*B65G 53/30* (2006.01)
*E21B 43/263* (2006.01)
*E21C 37/12* (2006.01)
*F04F 1/02* (2006.01)
*F04F 10/02* (2006.01)

(52) U.S. Cl.
CPC ............... *F42D 1/10* (2013.01); *B65G 53/30* (2013.01); *E21B 43/263* (2013.01); *E21C 37/12* (2013.01); *F04F 1/02* (2013.01); *F04F 10/02* (2013.01)

(58) Field of Classification Search
CPC ......... F42B 1/10; B65G 53/30; E21B 43/263; E21C 37/12; F04F 1/02; F04F 10/02
USPC ........................................... 102/313
See application file for complete search history.

(56) References Cited

U.S. PATENT DOCUMENTS

| 5,099,763 A | * | 3/1992 | Coursen | F42D 1/045 |
| | | | | 149/21 |
| 5,841,055 A | * | 11/1998 | Hooper | C06B 21/00 |
| | | | | 86/20.15 |
| 2017/0198560 A1 | * | 7/2017 | Mace | F42D 1/10 |

FOREIGN PATENT DOCUMENTS

| EP | 1126234 | 8/2001 |
| WO | WO2014041476 | 3/2014 |
| WO | WO2016053428 | 4/2016 |

OTHER PUBLICATIONS

International Search Report and Written Opinion for PCT/IB2021/053250 dated Jul. 20, 2021.

* cited by examiner

*Primary Examiner* — Samir Abdosh
(74) *Attorney, Agent, or Firm* — Parker Highlander PLLC

(57) ABSTRACT

A method of vertically transporting emulsion explosive includes, using a pump, pumping a predetermined volume of emulsion explosive, from an emulsion explosive reservoir, into a vertically extending pipe, wherein pumping is effected airtightly at least between the pump and a downstream end of a volume of emulsion explosive that has been pumped into the vertically extending pipe for at least a part of the travel of emulsion explosive of the predetermined volume of emulsion explosive down the vertical pipe.

10 Claims, 7 Drawing Sheets

TRANSPORT OF EXPLOSIVES

Figure 1:
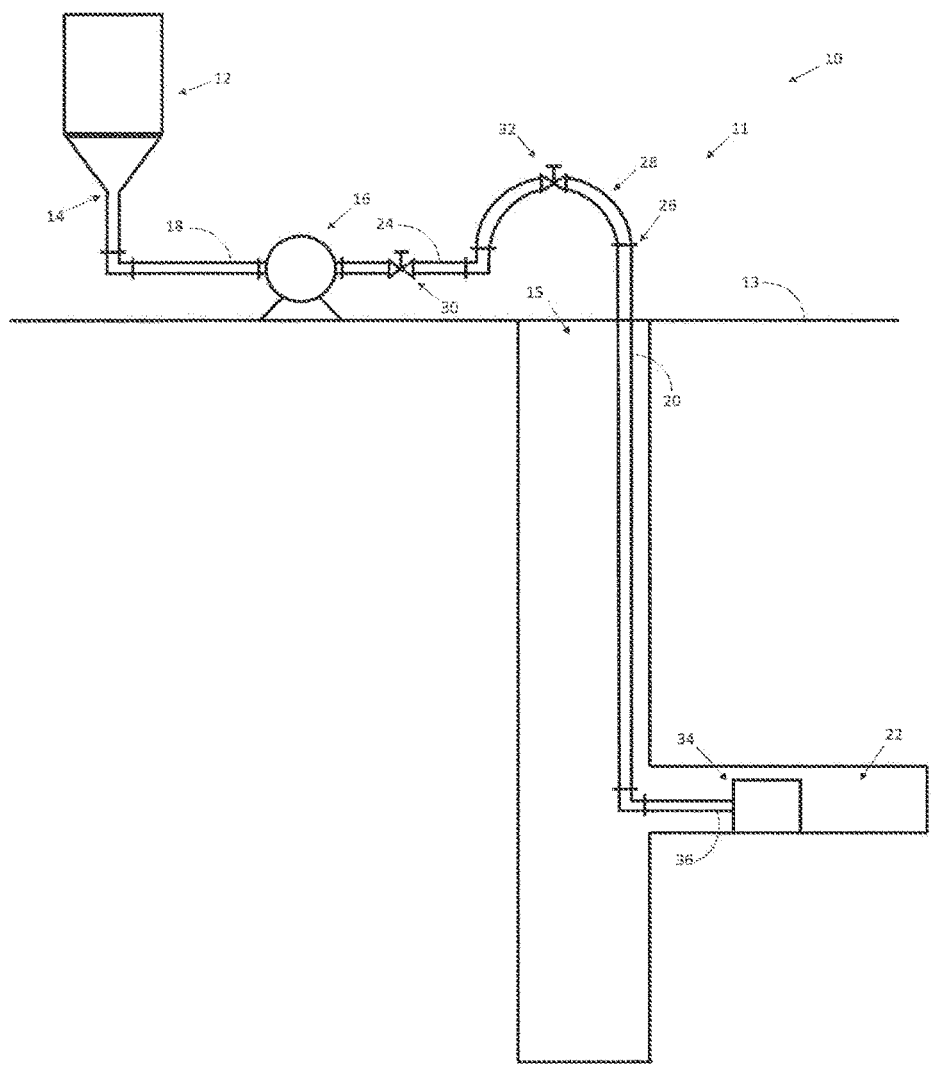

The present application is a national phase application under 35 U.S.C. § 371 of International Application No. PCT/IB2021/053250, filed Apr. 20, 2021, the entire contents of which are hereby incorporated by reference, and which claims the priority benefit of Great Britain Application No. 2005868.1, filed Apr. 22, 2020.

FIELD OF THE INVENTION

THIS INVENTION relates to transport of explosives. More specifically, the invention relates to vertical transport of explosives, particularly of emulsion explosives. The invention provides a method of vertically transporting emulsion explosive. The invention also provides an installation for vertically transporting emulsion explosive.

BACKGROUND TO THE INVENTION

VERTICAL TRANSPORT OF EMULSION EXPLOSIVES, for example down mine shafts for underground blasting operations, remains wrought with challenges.

The applicant has sought to address these challenges with the inventions of ZA 2011/01044 and ZA 2012/07171, which have been successfully exploited in practice.

Nevertheless, a need for alternative approaches remains, both to address the operational, safety and logistical challenges that are discussed in the specifications of the above-mentioned patents, and to protect the emulsion product during its transport.

More specifically, an emulsion that is transported vertically may, if dropped freely within a conduit over a sufficient distance, break up as a result of shearing and turbulent flow. A challenge in vertical transport of emulsion explosives is therefore to maintain laminar flow of emulsion explosive under gravity force/hydrostatic pressure.

The present invention finds application in the above respects.

SUMMARY OF THE INVENTION

IN ACCORDANCE WITH ONE ASPECT OF THE INVENTION IS PROVIDED a method of vertically transporting emulsion explosive, the method including, using a pump, pumping a predetermined volume of emulsion explosive, from an emulsion explosive reservoir, into a vertically extending pipe, wherein pumping is effected airtightly at least between the pump and a downstream end of a volume of emulsion explosive that has been pumped into the vertically extending pipe for at least a part of the travel of emulsion explosive of the predetermined volume of emulsion explosive down the vertical pipe.

Airtight pumping may, more preferably, be effected between the emulsion explosive reservoir and the downstream end of a volume of emulsion explosive that has been pumped into the vertically extending pipe for at least a part of the travel of emulsion explosive of the predetermined volume of emulsion explosive down the vertical pipe.

It is noted that there may be ancillary piping between the vertically extending pipe and the pump, and between the pump and the reservoir.

An emulsion explosive is a dispersion of two relatively immiscible liquids/phases: an aqueous oxidizer phase and a hydrocarbon fuel phase. Industrial grade fuels were blended with emulsifiers and formed an emulsion fuel phase or continuous phase. Emulsion grade ammonium nitrate was used in order to produce the emulsion oxidizer phase (dispersed phase), which was a water solution of metal nitrate(s). The above materials formed a part of highly concentrated emulsion explosives where the continuous phase did not exceed 10% of the emulsion by mass. A more detailed description of the emulsions and emulsion preparation can be found elsewhere (Masalova et al. 2007, 2006). The emulsion explosive term covers all explosives used in form of emulsion (dispersion of one phase in the other) in particular, may be so-called "sticky emulsion explosive the emulsion that was designed for "up-hole" applications or any other non-sticky emulsion formulation design for the other application such as development, tunnelling, stoping, etc.

The vertically extending pipe may be open to the atmosphere at a downstream end thereof, and may optionally feed into a secondary reservoir. It is noted that there may be ancillary piping connected to the downstream end of the vertically extending pipe, that may connect the downstream end of the vertically extending pipe to the secondary reservoir, if provided. In such a case, reference to the "downstream end" of the vertically extending pipe above and hereinafter, is to a downstream end of such ancillary piping.

In an alternative embodiment of the invention, the vertically extending pipe may be closed to the atmosphere at its downstream end, being configured for positive pressure to be applied to the downstream end of the predetermined volume of emulsion explosive, or part thereof, from the downstream end of the vertically extending pipe, as the predetermined volume of emulsion explosive, or part thereof, is travelling along the vertically extending pipe.

The vertically extending pipe may extend vertically for a vertical distance beyond 500 m, or beyond the emulsion column length associated with emulsion minimum burning pressure.

The emulsion explosive is typically not sensitised emulsion explosive, and the method may include sensitising the emulsion explosive at a downstream end of emulsion application, e.g. during charging blast holes with emulsion explosives.

Pumping may be effected at a velocity equal to the velocity due to gravity flow rate of the predetermined volume of emulsion explosive in the vertically extending pipe, i.e. the velocity of the predetermined volume of emulsion explosive when moving in the vertically extending pipe solely under gravity. More typically, pumping may be effected at a velocity higher than the gravity flow rate, or at a velocity lower than the gravity flow rate.

Preferably, pumping is effected at a velocity lower than the gravity flow rate.

Pumping may continue until the predetermined volume of emulsion explosive has passed through the pump. Pumping may then be discontinued. This may include airtightly isolating the pump from an upstream end of the predetermined volume of emulsion explosive, e.g. by means of a valve, typically downstream of the pump, that is closed.

After pumping is discontinued, or even before, travel of the predetermined volume of emulsion explosive, or part thereof, along the vertically extending pipe, and ancillary piping upstream of the vertically extending pipe, if provided, would at least in part be under gravity.

When pumping has been discontinued, further travel of the predetermined volume of emulsion explosive, or part thereof, along the vertically extending pipe would be solely under gravity.

Continued travel of the predetermined volume of emulsion explosive, of part thereof, along the vertically extending pipe after pumping has been discontinued would result in a suction being formed between the pump, of a valve that separates the pump from the vertically extending pipe, and an upstream end of the predetermined volume of emulsion explosive.

It would be appreciated that the predetermined volume of emulsion explosive would therefore need to be sufficient to move under the force of gravity, against a suction pressure at its upstream end.

The predetermined volume of emulsion explosive may have a weight in the order of a number of tons, The maximum volume/weight restriction is applicable in connection with emulsion minimum burning pressure and the stationary emulsion column should not generate a hydrostatic pressure that exceeds emulsion minimum burning pressure.

In some embodiments of the invention, depending on the length of the vertically extending pipe, and ancillary piping, and the volume of the predetermined volume of emulsion explosive, pumping may continue after some of the predetermined volume of emulsion explosive, or part thereof, has started exiting the downstream end of the vertically extending pipe, with pumping only being discontinued thereafter. It would be appreciated that, in such embodiments, the vertically extending pipe would never contain the entire predetermined volume of emulsion explosive at any point in time.

In other embodiments of the invention, pumping may be discontinued before the downstream end of the predetermined volume of emulsion explosive has reached the downstream end of the vertically extending pipe. It would be appreciated that, in such embodiments, the vertically extending pipe would typically contain the entire predetermined volume of emulsion explosive at some point in time.

IN ACCORDANCE WITH ANOTHER ASPECT OF THE INVENTION IS PROVIDED an installation for transporting emulsion explosive vertically, in accordance with the method of the invention, the installation including an emulsion explosive reservoir, for containing emulsion explosive, and having an outlet;
optionally, a pump arranged to withdraw emulsion explosive from the emulsion explosive reservoir through its outlet, by applying suction to emulsion explosive contained in the emulsion explosive reservoir;
a vertically extending pipe having an upstream end; and
a continuous conduit extending from the pump to the upstream end of the vertically extending pipe, and into the vertically extending pipe.

The characteristics of features of the installation carrying the same name as features of the method of the invention may be as hereinbefore described in respect of the method of the invention.

The vertically extending pipe may extend vertically for a vertical distance beyond 100 m, even beyond 500 m, e.g. 680 m, and even beyond 980 m.

Having a continuous conduit extend from the outlet of the emulsion explosive reservoir, through the pump, to the upstream end of the vertically extending pipe, and into the vertically extending pipe, allows airtight pumping of emulsion explosive from the pump into the vertically extending pipe, such that no air is allowed into the installation between the pump and a downstream end of a volume of emulsion explosive that has been pumped into the vertically extending pipe for at least a part of the travel of emulsion explosive of the predetermined volume of emulsion explosive down the vertical pipe.

More preferably, the continuous conduit may extend from the outlet of the reservoir, through the pump, to the upstream end of the vertically extending pipe, and into the vertically extending pipe, allowing for airtight pumping along such an, extended, conduit.

The installation would typically be at an underground mining operation, with the vertically extending pipe extending vertically to an underground location at which the emulsion explosive is required.

As provided for in respect of the method of the invention, the installation may include a secondary emulsion explosive reservoir located at a downstream end of the vertically extending pipe, for emulsion explosive to be discharged into the secondary reservoir.

DETAILED DESCRIPTION OF AN EXEMPLARY EMBODIMENT

THE INVENTION WILL NOW BE DESCRIBED IN MORE DETAIL in terms of an exemplary embodiment, with reference to the accompanying diagrammatic drawings in which FIG. 1 shows an installation according to the invention, installed at an underground mining operation, and FIGS. 2 to 7 show various stages of operation of two embodiments of the installation.

Referring to the drawings an more specifically fir FIG. 1, reference numeral 10 generally indicates an underground mining operation that includes a mine shaft 15 that has been sunken into a body of earth through a surface 13 of the body of earth.

The mining operation 10 includes an installation 11 according to the invention.

The installation 11 includes a primary emulsion explosive reservoir 12 that contains non-sensitised, bulk emulsion explosive.

The primary reservoir 12 has an outlet 14, from which emulsion explosive can be withdrawn from the reservoir 12.

The installation 11 further includes a pump 16, located downstream of the reservoir 12.

An inlet of the pump 16 is connected to the outlet 14 of the reservoir by a first ancillary pipe section 18. Thus, by applying suction with the pump 16 along the pipe section 18, to emulsion explosive contained in the reservoir 12, the pump 16 can withdraw emulsion explosive from the reservoir 12 along the pipe section 18.

The installation 11 also includes a vertically extending pipe 20 that extends vertically down the mine shaft 13 to an underground location 22, to which underground location emulsion explosive would be delivered by the installation 11.

The underground location 22 is located at a depth of 500 m or more beneath the surface 13 of the body of earth of the mining operation, e.g. 680 m. Thus, the vertically extending pipe 20 has a length of over 500 m, approximating the depth of the underground location 22.

The installation 11 further includes, upstream of the vertically extending pipe 20 a second ancillary pipe section 24 that connects an outlet of the pump 16 to an inlet 26 to the vertically extending pipe 20.

The pipe section 24 has a so-called goose-neck configuration 28 immediately upstream of the inlet 26 to the vertically extending pipe 20.

A first valve 30 is located in the pipe section 24 between the pump 16 and the goose-neck configuration 28.

A second valve 32 is located in the goose-neck configuration 28.

The first valve 30 is configured to close-off the pump 16 from the goose-neck 28.

The valve 32 is configured selectively to allow and disallow atmospheric air into the goose-neck 28 from outside of the pipe section 24.

Connection of the outlet 14 of the reservoir 12 to the inlet 26 to the vertical pipe section is such that emulsion explosive can be withdrawn from the reservoir 12 and pumped, continuously and airtightly, into the vertically extending pipe 20, wherein airtight refers to the region between the outlet 14 of the reservoir 12 and a downstream end of a continuous volume of emulsion explosive extending from the outlet 14 into the vertically extending pipe 20.

The installation 11 also includes a secondary emulsion explosive reservoir 34 at the underground location.

The installation 11 further includes a third ancillary pipe section 36 that extends between a downstream end of the vertically extending pipe 20 and the secondary reservoir 34, such that emulsion explosive travelling along the vertically extending pipe 20 can be fed into the reservoir 34 along the pipe section 36.

Use of the installation 11 in performing the method of the invention will now be described with reference to FIGS. 2 to 7.

Figure 2:
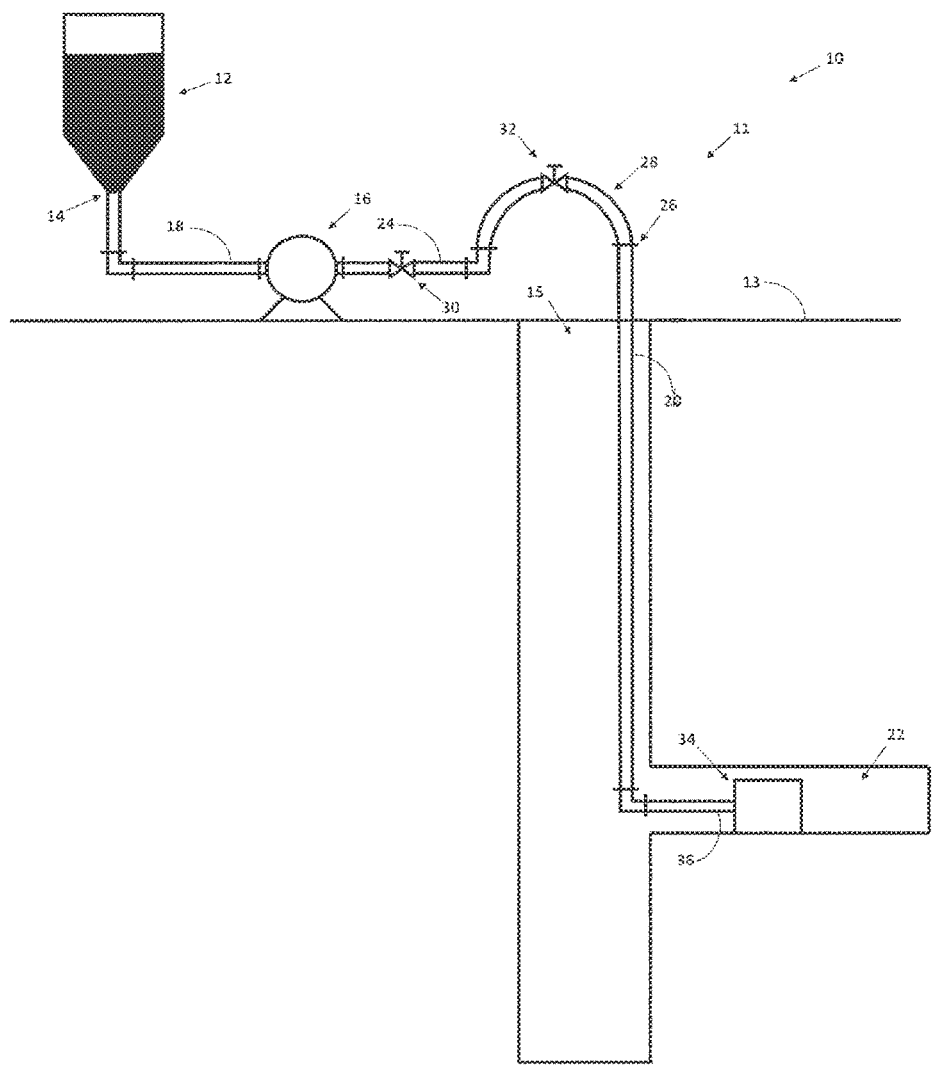
Figure 3:
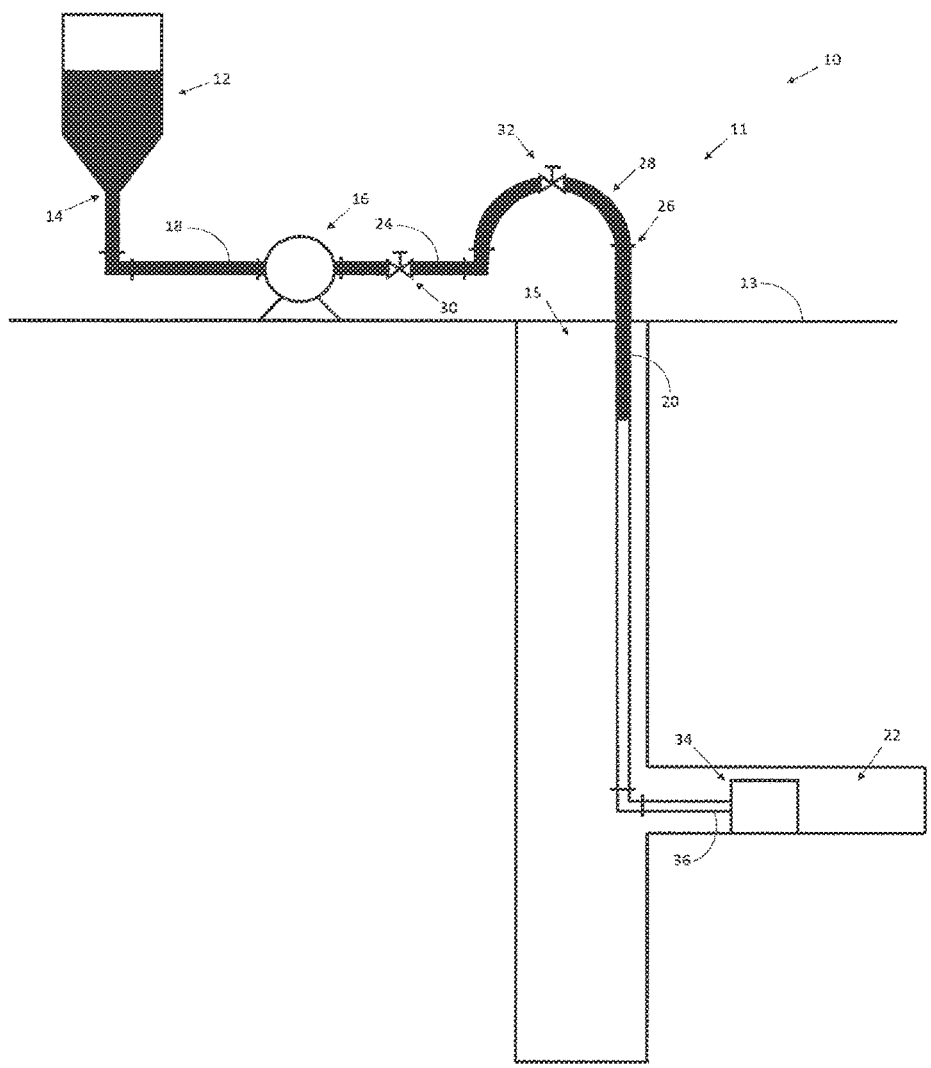

At start-up, as illustrated in FIG. 2, the reservoir 12 would contain a predetermined stored volume of emulsion explosive, a predetermined volume of which needs to be transported to the underground location 22.

With valve 30 open and valve 32 closed, the pump 16 is activated to apply suction to the emulsion explosive contained in the reservoir 12, thereby withdrawing emulsion explosive from the reservoir 12 and pumping withdrawn emulsion explosive into the vertically extending pipe 20 along the pipe sections 18 and 24.

Thus, a continuous volume of emulsion explosive, extending from the reservoir 12, through the outlet 14, the pipe section 18 and, the pipe section 24, and into the vertically extending pipe 20, is formed, air-tightly between the reservoir and a downstream end of the continuous volume of emulsion explosive.

As pumping continues (see FIG. 3), the volume of emulsion explosive pumped into the vertically extending pipe 20 extends progressively further along the vertically extending pipe 20. Initially, movement of the emulsion explosive in the vertically extending pipe 20 is driven by the pump, but once a sufficient volume of emulsion explosive has been pumped into the vertically extending pipe 20, movement is assisted by gravity.

In accordance with the invention, discontinuation of pumping is required. In this regard, two scenarios may exist. These are discussed with reference to FIGS. 4 to 7.

Figure 4:
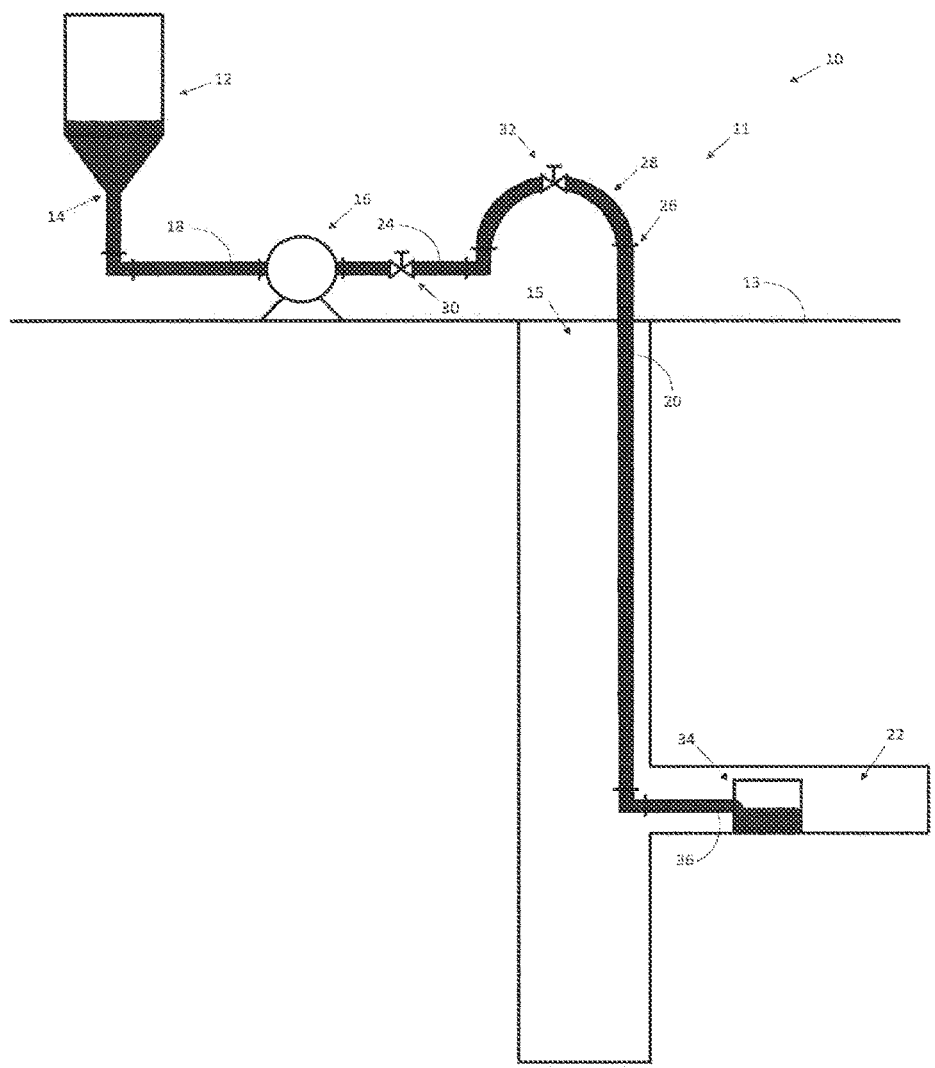
Figure 5:
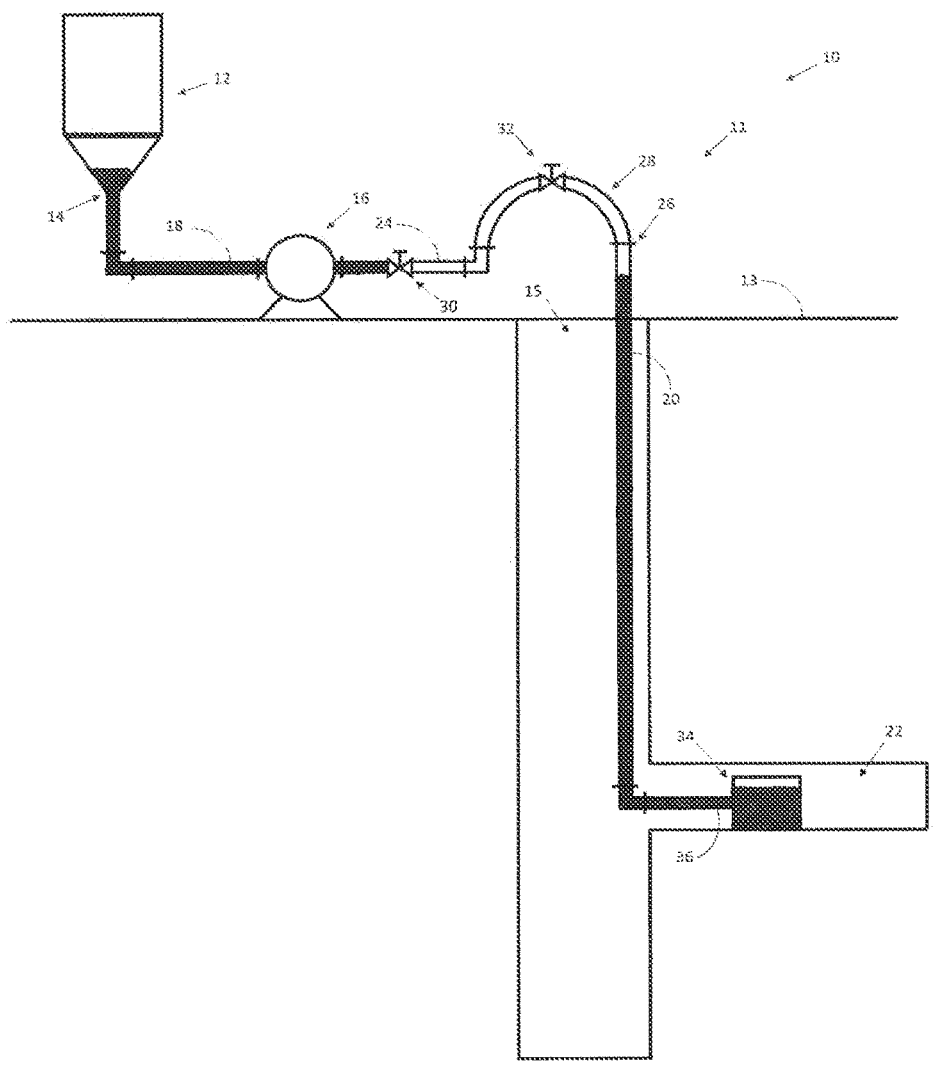

In one scenario, referring to FIGS. 4 and 5, pumping is discontinued only after discharge of emulsion explosive into the reservoir 34 has commenced.

As will be seen from FIG. 4, a continuous volume of emulsion explosive extends from the reservoir 12 into the reservoir 34, signifying that pumping continued beyond the commencement of discharge of emulsion explosive into the reservoir 34.

Once a predetermined volume of emulsion explosive has been withdrawn from the reservoir 12, and has passed beyond the valve 30, pumping is discontinued and the valve 30 is closed.

Discharge of emulsion explosive downstream of the valve 30 then continues under force of gravity, with a vacuum being created downstream of the valve 30, and upstream of an upstream end of the volume of emulsion explosive contained in the vertically extending pipe 20, as shown in FIG. 5.

To ensure complete discharge of emulsion explosive from the vertically extending pipe into the reservoir 34, it may be necessary to allow air into the vertically extending pipe 20, which would be achieved by opening the valve 32.

In another embodiment, as discussed with reference to FIGS. 6 and 7, pumping is discontinued before discharge of emulsion explosive into the reservoir 34 has commenced.

Figure 6:
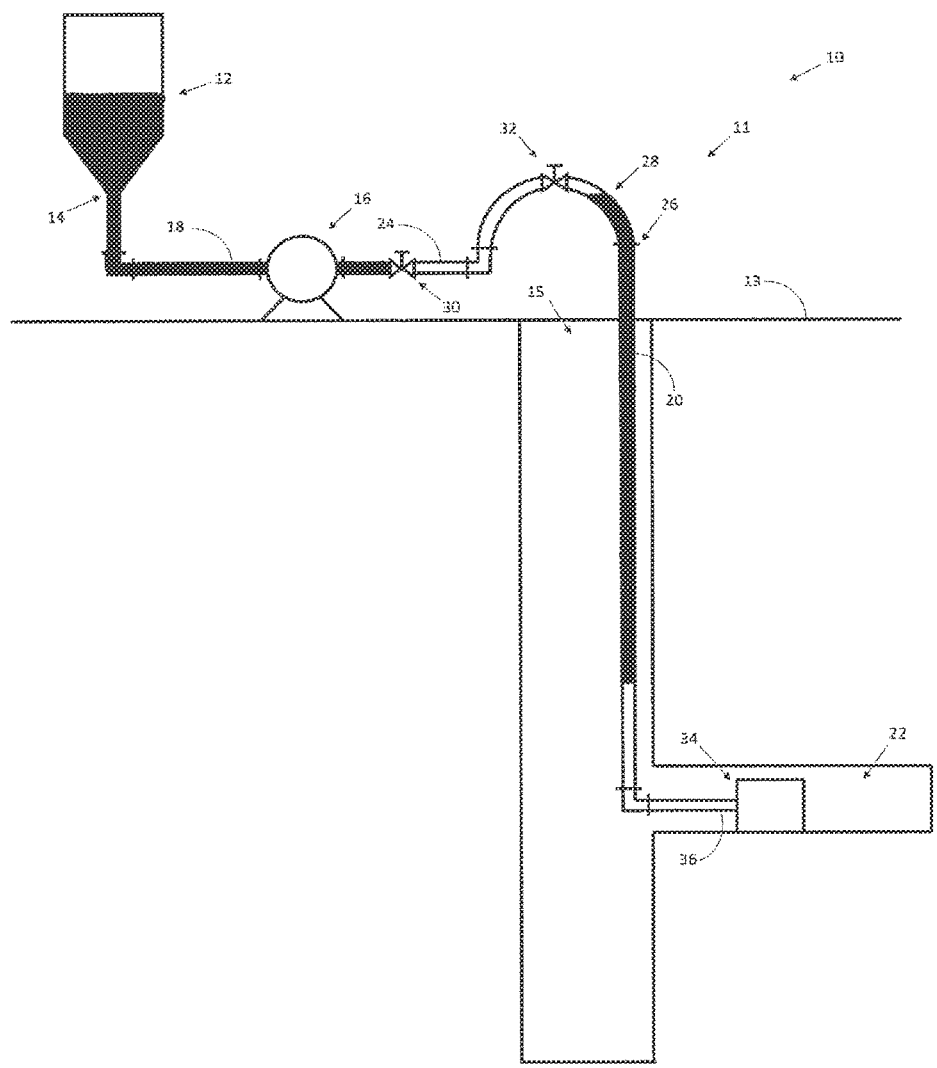

As shown in FIG. 6, a downstream end of a volume of emulsion explosive pumped into the vertically extending conduit is still spaced from the reservoir 34, at a time when a predetermined volume of emulsion explosive has been pumped passed the valve 30. At that time, pumping is discontinued, and the valve 30 is closed. Thus, a discreet "slug" of emulsion explosive is created downstream of the valve 30, again with a vacuum being formed as described above.

Figure 7:
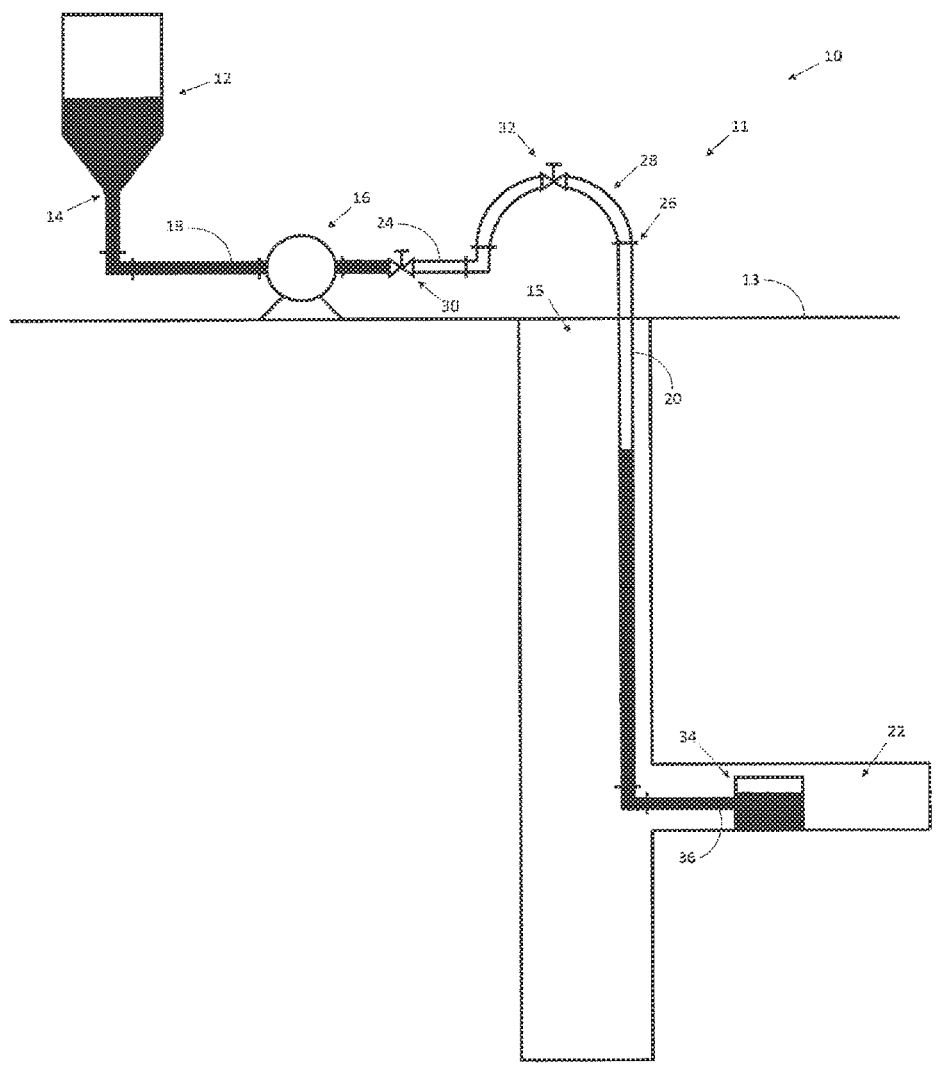

Continued movement of the slug down the vertically extending pipe 20 would be under force of gravity, ultimately resulting in the slug discharging into the reservoir 34, as shown in FIG. 7.

Again, as in the first-mentioned embodiment, it may be necessary to allow air into the vertically extending pipe by opening valve 32 for complete draining of emulsion explosive from the vertically extending pipe.

DISCUSSION

THE CONVENTIONAL APPROACH to vertical transport of emulsion explosive is to drop emulsion explosive freely, under gravity, along a pipe that is open to the atmosphere.

Beyond a certain depth, this approach is no longer feasible, however, due to the flow of emulsion explosive becoming turbulent as a result of shearing between the emulsion explosive and a pipe along which it is dropped.

In the present invention, the applicant has surprisingly found that by positively pumping explosive down a vertically extending pipe in an air-tight manner, and thereafter discontinuing pumping, after a predetermined volume has been pumped into the vertically extending pipe, such damage is significantly reduced and even avoided.

In this regard the applicant has found that pumping at a rate lower than the gravity flow rate for a particular predetermined volume of emulsion explosive is particularly advantageous, in that damage to the emulsion is virtually obviated.

The invention claimed is:

1. A method of vertically transporting emulsion explosive, the method including, using a pump, pumping a predetermined volume of emulsion explosive, from an emulsion explosive reservoir, into a vertically extending pipe, wherein pumping is effected airtightly at least between the pump and a downstream end of a volume of emulsion explosive that has been pumped into the vertically extending pipe for at least a part of the travel of emulsion explosive of the predetermined volume of emulsion explosive down the vertical pipe, wherein the vertically extending pipe extends vertically for a vertical distance beyond 500 m.

2. The method according to claim 1, wherein airtight pumping is effected between the emulsion explosive reservoir and the downstream end of a volume of emulsion explosive that has been pumped into the vertically extending pipe for at least a part of the travel of emulsion explosive of the predetermined volume of emulsion explosive down the vertical pipe.

3. The method according to claim 1, wherein the vertically extending pipe is open to the atmosphere at a downstream end thereof.

4. The method according to claim 1, wherein the vertically extending pipe is closed to the atmosphere at its downstream end, being configured for positive pressure to be applied to the downstream end of the predetermined volume of emulsion explosive, or part thereof, from the downstream end of the vertically extending pipe, as the predetermined volume of emulsion explosive, or part thereof, is travelling along the vertically extending pipe.

5. The method according to claim 1, wherein pumping continues until the predetermined volume of emulsion explosive has passed through the pump.

6. A method of vertically transporting emulsion explosive, the method including, using a pump, pumping a predetermined volume of emulsion explosive, from an emulsion explosive reservoir, into a vertically extending pipe, wherein pumping is effected airtightly at least between the pump and a downstream end of a volume of emulsion explosive that has been pumped into the vertically extending pipe for at least a part of the travel of emulsion explosive of the predetermined volume of emulsion explosive down the vertical pipe, wherein the emulsion explosive is unsensitised emulsion explosive, and the method includes sensitising the emulsion explosive downstream of a downstream end of the vertically extending pipe.

7. The method according to claim 6, wherein airtight pumping is effected between the emulsion explosive reservoir and the downstream end of a volume of emulsion explosive that has been pumped into the vertically extending pipe for at least a part of the travel of emulsion explosive of the predetermined volume of emulsion explosive down the vertical pipe.

8. The method according to claim 6, wherein the vertically extending pipe is open to the atmosphere at a downstream end thereof.

9. The method according to claim 6, wherein the vertically extending pipe is closed to the atmosphere at its downstream end, being configured for positive pressure to be applied to the downstream end of the predetermined volume of emulsion explosive, or part thereof, from the downstream end of the vertically extending pipe, as the predetermined volume of emulsion explosive, or part thereof, is travelling along the vertically extending pipe.

10. The method according to claim 6, wherein pumping continues until the predetermined volume of emulsion explosive has passed through the pump.

* * * * *